US007724264B2

(12) United States Patent
Mehta et al.

(10) Patent No.: US 7,724,264 B2
(45) Date of Patent: May 25, 2010

(54) CALCULATING DISPLAY MODE VALUES

(75) Inventors: Kalpesh Mehta, Chandler, AZ (US); Mike Donlon, Diamond Springs, CA (US); Eric Samson, Folsom, CA (US); Wen-Shan (Vincent) Wang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 10/759,504

(22) Filed: Jan. 16, 2004

(65) Prior Publication Data

US 2004/0145582 A1 Jul. 29, 2004

Related U.S. Application Data

(63) Continuation of application No. 09/579,335, filed on May 25, 2000, now Pat. No. 6,693,641.

(51) Int. Cl.
*G09G 5/36* (2006.01)
*G09G 5/39* (2006.01)
*G06F 13/372* (2006.01)

(52) U.S. Cl. ........................ 345/558; 345/534; 345/531

(58) Field of Classification Search ................ 345/531, 345/530, 533, 534, 558, 536, 537; 710/53, 710/57, 60
See application file for complete search history.

(56) References Cited

U.S. PATENT DOCUMENTS

| | | | | |
|---|---|---|---|---|
| 5,500,939 | A | 3/1996 | Kurihara | |
| 5,506,809 | A | 4/1996 | Csoppenszky et al. | |
| 5,617,118 | A | 4/1997 | Thompson | |
| 5,953,020 | A * | 9/1999 | Wang et al. | 345/558 |
| 6,157,397 | A * | 12/2000 | Bogin et al. | 345/538 |
| 6,499,072 | B1 * | 12/2002 | Frank et al. | 710/100 |
| 6,600,492 | B1 * | 7/2003 | Shimomura et al. | 345/501 |
| 6,628,292 | B1 * | 9/2003 | Ashburn et al. | 345/565 |

* cited by examiner

*Primary Examiner*—Joni Hsu
(74) *Attorney, Agent, or Firm*—Trop, Pruner & Hu, P.C.

(57) ABSTRACT

Values are calculated which control the manner in which a display streamer directs the movement of display data. The values are stored in the display streamer.

5 Claims, 4 Drawing Sheets

CALCULATING DISPLAY MODE VALUES

CROSS-REFERENCE TO RELATED APPLICATIONS

This application is a continuation application which claims benefit of U.S. application Ser. No. 09/579,335, filed May 25, 2000 now U.S. Pat. No. 6,693,641. The disclosure of the prior application is considered part of (and is incorporated by reference in) the disclosure of this application.

BACKGROUND

This invention relates to calculating display mode values.

A display streamer in a graphics processor requests display data from memory to be temporarily stored in a FIFO (first-in first-out) and continuously feeds the display data to a display engine. Any break or interruption in feeding the display data results in visual artifacts in the final output (display) on a display device, e.g., an analog cathode ray tube (CRT) monitor. Additionally, the memory is usually most efficient when providing data at a high rate while the graphics processor can usually only use data at a rate that is much lower than this high rate.

To eliminate these visual artifacts and increase efficiency, the display streamer may be programmed with a watermark value and a burst length value for each display mode supported by the graphics processor. A display mode can be, e.g., a combination including display device resolution, color depth or pixel depth, refresh rates, and system configuration. The watermark value represents a FIFO size and falls between the minimum and maximum size of the FIFO, usually expressed in quadwords (QW) that are blocks of eight bytes each.

When the amount of data in the FIFO drops below the watermark value for the current display mode, the display streamer requests more display data from memory. A display mode's burst length value falls between the minimum and maximum amounts of display data, usually expressed in QW, that the display streamer may request from memory at a time. Analytic models may be used to predict the watermark values and burst length values for each display mode. There are over one hundred display modes.

DESCRIPTION

Figure 1:
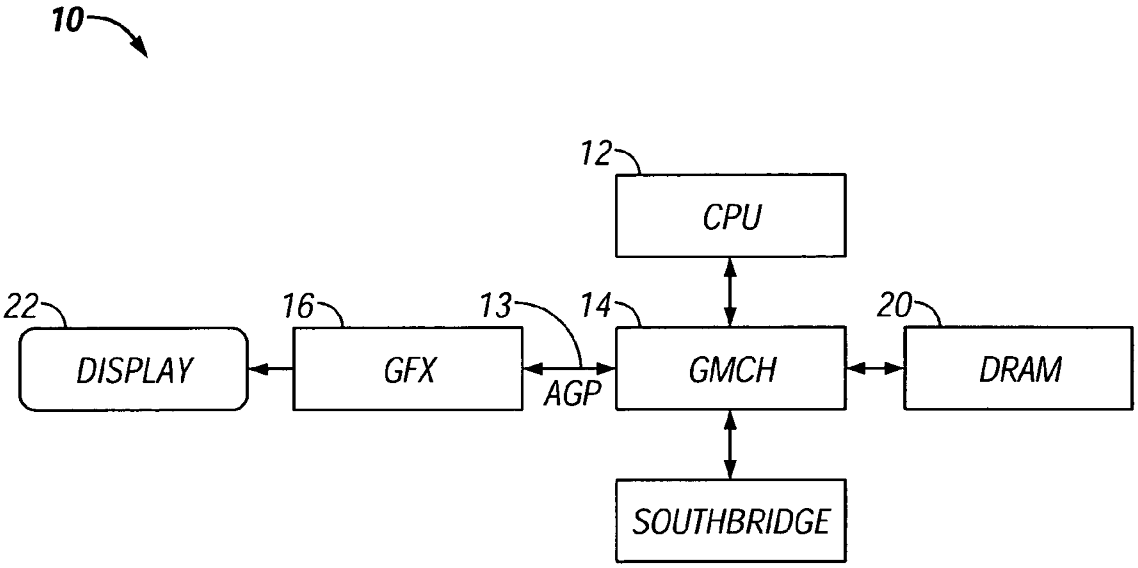
FIG. 1 is a block diagram of a computer system in accordance with an embodiment of the invention.

Referring to FIG. 1, a system 10 includes a central processing unit (CPU) 12 that computes watermark values and burst length values "on the fly" as the system 10 encounters different display modes. Different display modes result from different configurations of the system 10. A configuration can be, e.g., a particular combination of multiple displays, display resolutions, color depths, refresh rates, overlay scaling conditions, video capture conditions, and/or other system configurations. The CPU 12 programs one of the watermark values as a current watermark value and one of the burst length values as a current burst length value into a graphics controller for use in processing the graphics or video data destined for display on one or more display devices 22. The graphics controller could be included in either a graphics/memory controller (GMCH) 14 or a graphics controller (Gfx) 16 hanging on an accelerated graphics port (AGP) 18. In this embodiment, assume that the graphics controller is included in the GMCH 14. The GMCH 14 uses these values in streaming video or graphics image data. This data can be lines of the image held in main memory, e.g., dynamic random access memory (DRAM) 20, to a display device 22, e.g., a computer monitor, a television, or a floating point display unit.

Figure 2:
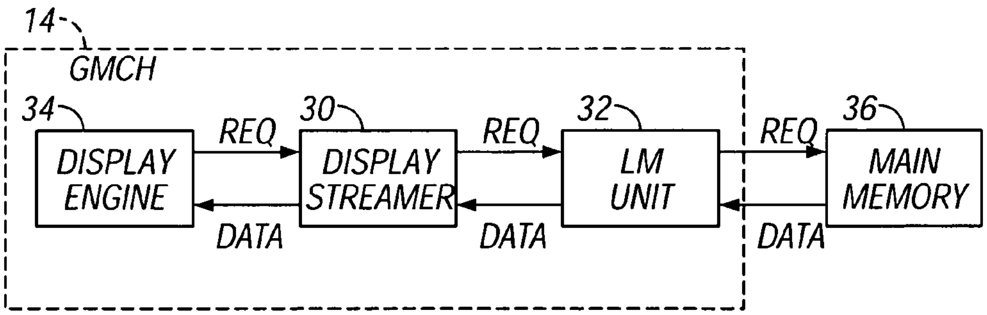
FIG. 2 is a block diagram of a display system included in the computer system of FIG. 1.

Also referring to FIG. 2, a software driver (not shown) and/or a hardware logic unit (not shown) included in the CPU 12 calculates the watermark values and burst length values using the formulas discussed below and programs a display streamer 30 in the GMCH 14 with a watermark value and a burst length value for the current display mode, the present display mode of the system 10. These values enable the display streamer 30 to more efficiently control how and when the data is fetched from any data source, including local memory 32 and/or main memory 36, e.g., DRAM or synchronous dynamic random access memory (SDRAM), and provided to a display mechanism such as a display engine 34, a device that provides the display device 22 with displayable data. Local memory 32 may be included in the GMCH 14, in the Gfx 16, or as a separate unit.

Any hardware system having a memory that can store data included in an isochronous data stream, i.e., real-time, non-display data streams, e.g., modems, LANs (local area networks), and other real-time systems with event deadlines, can compute watermark and burst length values "on-the-fly" using the formulas below. The hardware system can use the software driver and/or the hardware logic unit to compute the watermark and burst length values and improve the efficiency of transferring the isochronous data between the memory and a destination of the isochronous data included in the hardware system.

Figure 3:
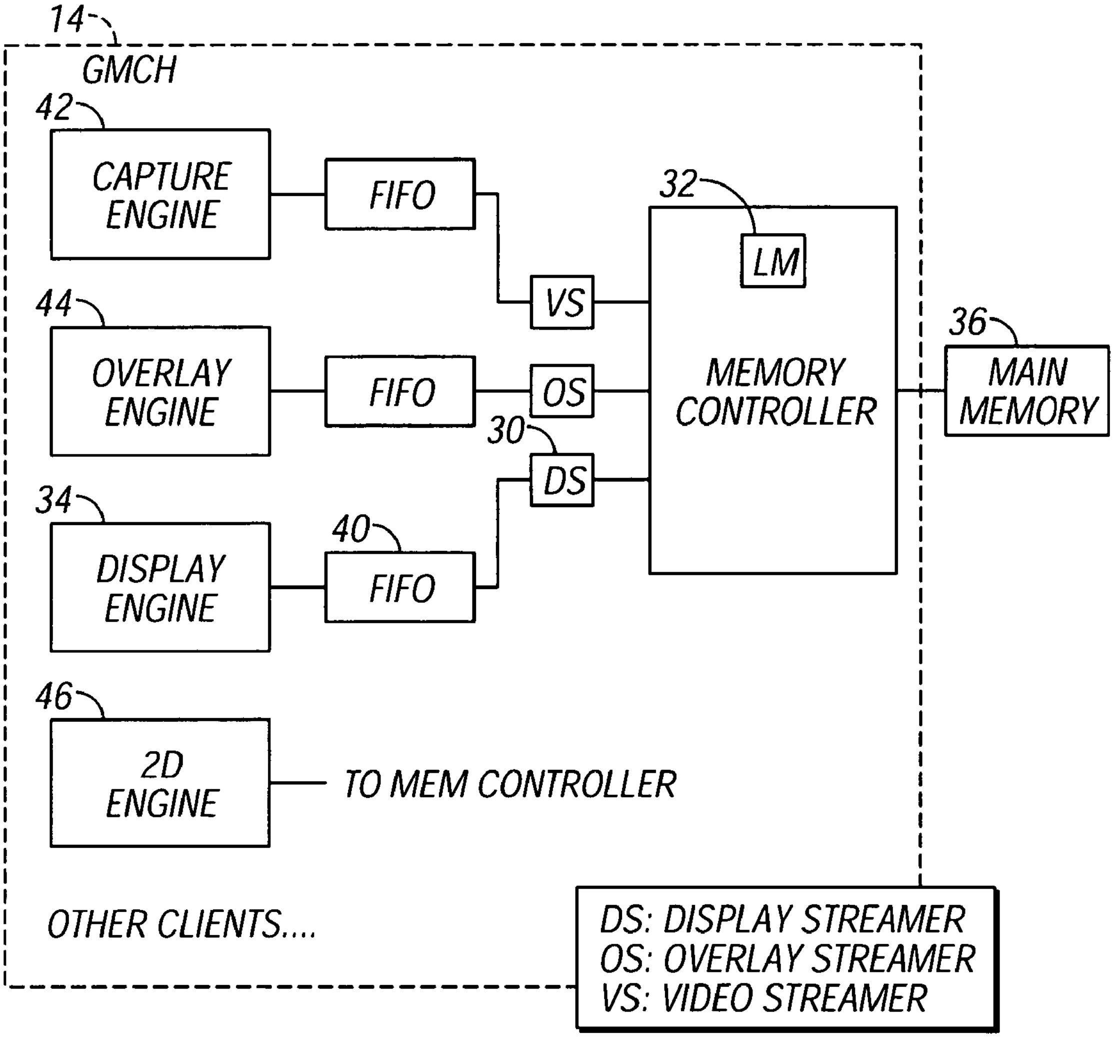
FIG. 3 is a diagram of the display system of FIG. 2.

Also referring to FIG. 3, a display FIFO 40 located between the memory controller 31 and the display engine 34 eliminates visual artifacts and smooth out delay jitters. Delay jitters manifest as flickers or breaks on the display device 22 and smoothing them out produces more pleasing video or graphics images, ones with less visual artifacts. The display FIFO 40 holds up to a certain number of quadwords (QW) of data fetched from local memory 32 or main memory 36, ready to be processed by the display engine 34 and shown on the display device 22. If the local memory 32 is a separate unit, it can connect to the memory controller 31 and use the main memory 36.

Storing QW of data in the display FIFO 40 can help increase efficiency of the data transfer between the memory and the graphics controller. The memory can provide data at one rate while the graphics controller can use data at another, slower rate by storing data the graphics controller is not ready to use in the FIFO 40.

The maximum size of the display FIFO 40 depends on the worst case delay (maximum latency, $L_{max}$), the FIFO fill rate, and the FIFO drain rate. The arbitration policy in the memory controller 14 determines $L_{max}$. For example, the display engine 34 may be granted access to local memory 32 more frequently than other isochronous clients such as a video capture engine 42 or an overlay scaling engine 44 and more frequently than non-isochronous clients such as a two-dimensional engine 46. The value of $L_{max}$ represents the maximum amount of time in clock cycles that the display engine 34 may have to wait before winning another arbitration event and gaining access to local memory 32 to obtain data to occupy the display FIFO 40. The speed of the SDRAM 36 determines the FIFO fill rate ($\phi$), expressed in QW per local memory clock cycle. The FIFO drain rate ($\delta$), expressed in QW per clock cycle, is determined by the rate at which data is consumed by the display engine 34. The display resolution and the refresh rate contribute to $\delta$ as shown below.

The display streamer 30 uses the watermark value ($\lambda$) and the burst length value ($\beta$) calculated by the driver and/or the hardware logic unit in the CPU 12 and programmed into a register included in the display streamer 30 in continuously monitoring the level of data in the display FIFO 40 and ensuring that the display engine 34 receives a continuous flow of data. If the FIFO level falls below $\lambda$, the display streamer 30 issues a request in a burst action to local memory 32 or main memory 20, 36 for an amount of data equal to $\beta$ to occupy the display FIFO 40.

The driver and/or hardware logic unit in the CPU 12 chooses $\lambda$ as a value between a minimum watermark value ($\lambda_{min}$) and a maximum watermark value ($\lambda_{max}$). $\lambda_{min}$ is the value which avoids FIFO underflows and delay jitter. $\lambda_{min}$ is given by:

$$\lambda_{min}=L_{max}\times\delta$$

Because this formula likely returns $\lambda_{min}$ as a floating point number and because computer systems operate with integers, the driver and/or hardware logic unit computes $\lambda_{min}$ with a ceiling subroutine as the smallest integer value greater than the floating point value of $\lambda_{min}$. A $\lambda_{min}$ at this integer value helps the display FIFO 40 avoid underflows because $\lambda_{min}$ is greater than the FIFO drain during $L_{max}$ cycles of waiting.

The amount of data in QW ($\beta$) that the display streamer 30 requests in response to detecting a data level below $\lambda$ in the display FIFO 40 falls between a minimum burst length value ($\beta_{min}$) and a maximum burst length value ($\beta_{max}$) $\beta_{min}$ is given by:

$$\beta_{min}=\lambda_{min}\times\left(\frac{\varphi}{\varphi-\delta}\right)$$

As with $\lambda_{min}$, the driver and/or hardware logic unit computes $\beta_{min}$ with a ceiling subroutine as the smallest integer value greater than the floating point value of $\beta_{min}$. This integer $\beta_{min}$ value ensures that the display streamer 30 requests enough QW to guarantee that the level of the display FIFO 40 meets or exceeds $\lambda_{min}$ at the end of the burst.

To ensure that the display FIFO 40 does not overflow, the display streamer 30 should not request more QW than a maximum burst length value ($\beta_{max}$) in a given burst. $\beta_{max}$ is given by:

$$\beta_{max}=(\Phi-\lambda_{min})\times\left(\frac{\varphi}{\varphi-\delta}\right),$$

where $\Phi$ equals the size of the display FIFO 40 in QW. Since this $\beta_{max}$ formula likely returns a floating point value, the driver and/or hardware logic unit uses a floor subroutine to calculate an integer $\beta_{max}$ value that is the largest integer value less than the floating point value of $\beta_{max}$.

Also to help prevent overflow, the maximum watermark level ($\lambda_{max}$) indicates the maximum amount of data that the display FIFO 40 may contain when the display streamer 30 begins a burst without overflowing the display FIFO 40 with the requested data. $\lambda_{max}$ is given by:

$$\lambda_{max}=\Phi-(L_{max}\times\delta)$$

As with $\beta_{max}$, the driver and/or hardware logic unit uses a floor subroutine to calculate an integer value of $\lambda_{max}$ that is the largest integer value less than the floating point value of $\lambda_{max}$.

Figure 4:
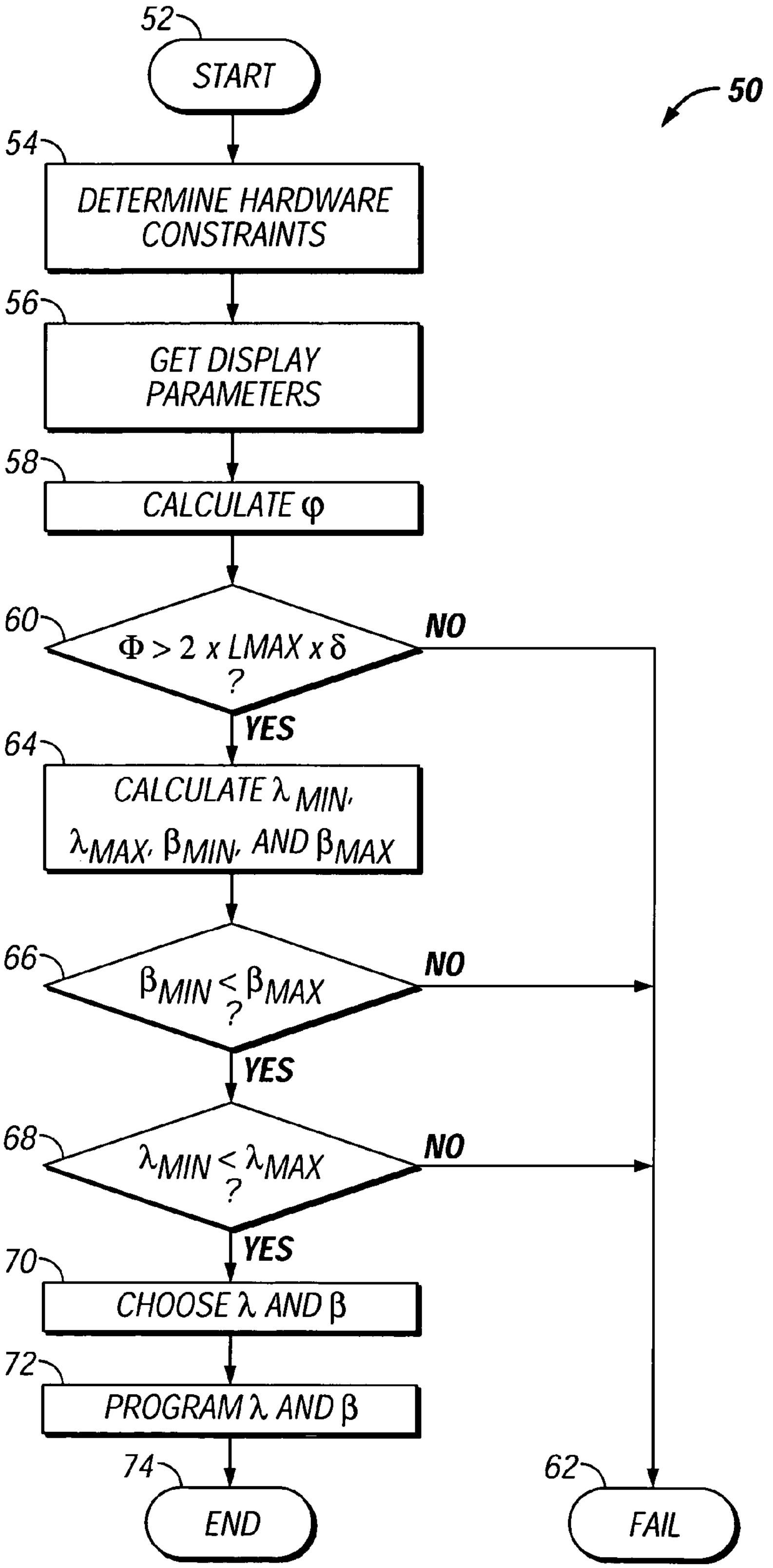
FIG. 4 is a flowchart of calculating and programming display mode values in accordance with an embodiment of the invention.

Also referring to FIG. 4, the driver and/or hardware logic unit in the CPU 12 uses a process 50 to calculate the watermark value and the burst length value for a current display mode. The process 50 begins (52) by determining (54) any constraints of the system hardware under the current display mode from the graphics/memory controller 14, graphics controller 12, and/or the display device 22. Such constraints may include memory speed, multiple displays, overlay scaling functions, and/or video capture functions. For example, in one current display mode, the display FIFO 40 size is 48 QW, local memory 32 is running at 133 MHz and the worst case latency ($L_{max}$) for the display streamer 30 is forty cycles. The driver and/or hardware logic unit also identifies (56) parameters of the display device 22 such as supportable resolutions, color depth, and refresh rates. In the current display mode, the display device 22 has a 1280×1024 resolution running at a 100 Hz refresh rate in 16 bpp (bits per pixel) mode. Based on these constraints and parameters, the driver and/or hardware logic unit can calculate (58) $\phi$, the FIFO fill rate. Assume that $\phi$ equals one in the current display mode. The driver and/or hardware logic unit may determine (54) the hardware constraints and identify (56) the display device's parameters in any order.

The driver and/or hardware logic unit then determines (60) if $\Phi$, the size of the display FIFO 40, is large enough for a specified drain rate $\delta$ and $L_{max}$ using the comparative formula:

$$\Phi>2\times L_{max}\times\delta,$$

where $\delta$ equals approximately 0.357 and is given by:

$$\delta=(\text{display clock frequency})\times\left(\frac{\text{bytes per pixel}}{\text{bytes per } QW\times\text{memory speed}}\right)$$

The display clock frequency (DCF) depends on the current display mode and can be expressed in an empirical formula as:

$$DCF=(\text{horizontal resolution})\times(\text{vertical resolution})\times(\text{refresh rate})\times 1.45,$$

where 1.45 is a multiplying factor. Other methods may be used to calculate the DCF, e.g., a table-based method or a Video Electronics Standards Association generalized timing formula (VESA GTF). If $\Phi$ is not large enough, then the display FIFO 40 is too small to handle the requirements of the current display mode and the process 50 fails (62). If $\Phi$ is large enough, then the driver and/or hardware logic unit may proceed to calculate (64) the watermark value and the burst length value for the current display mode.

The driver and/or hardware logic unit calculates (64) integer values for $\lambda_{min}$, $\lambda_{max}$, $\beta_{min}$, and $\beta_{max}$ as described above. In the current display mode, they respectively equal fifteen, thirty-three, twenty-four, and fifty-one. The driver and/or hardware logic unit compares (66) $\beta_{min}$ and $\beta_{max}$ to see if the system 10 can accommodate the current display mode. If $\beta_{max}$ is less than $\beta_{min}$, then the process fails (62), and the current display mode is unsupportable. Otherwise, the driver and/or hardware logic unit compares (68) $\lambda_{min}$ and $\lambda_{max}$. The driver and/or hardware logic unit may compare (66, 68) either burst length values or watermark values first. If $\lambda_{max}$ is greater than $\lambda_{min}$, then the process 50 fails (62). Otherwise, the driver and/or hardware logic unit chooses (70) a watermark value $\lambda$ between $\lambda_{min}$ and $\lambda_{max}$ and a burst length value $\beta$ between $\beta_{min}$ and $\beta_{max}$.

Figure 5:
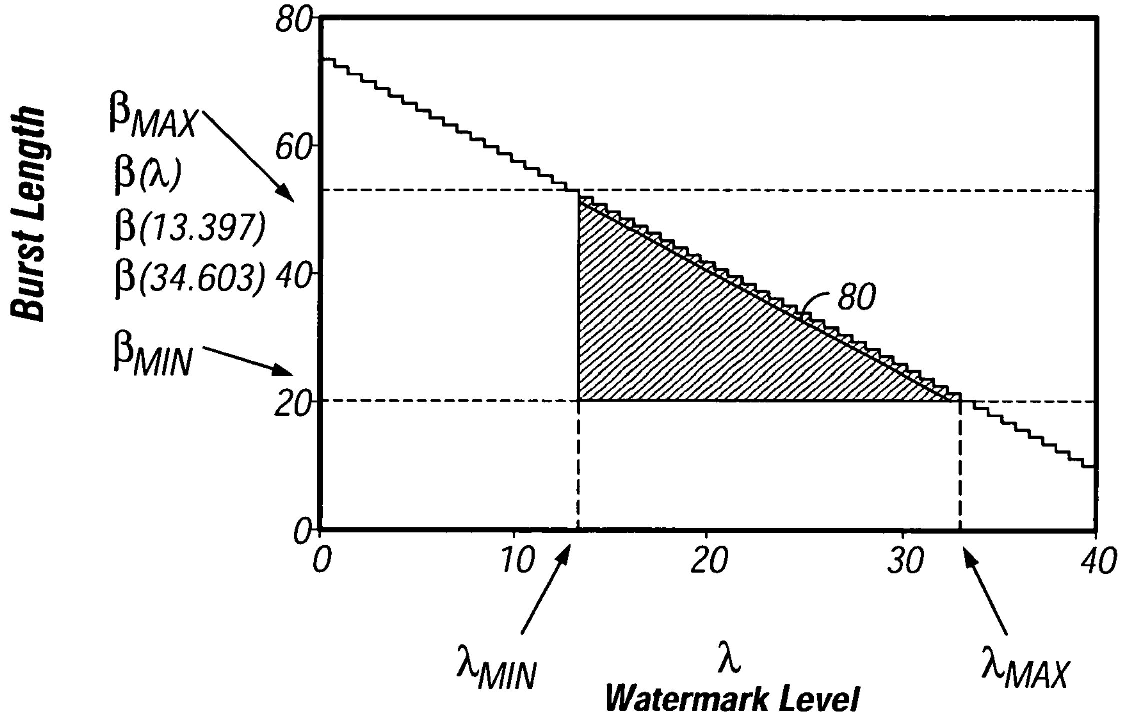
FIG. 5 is a graph showing display mode values.

Also referring to FIG. 5, the driver and/or hardware logic unit chooses (70) $\lambda$ and $\beta$ for the current display mode from within a region 80 defined by $\lambda_{min}$, $\lambda_{max}$, $\beta_{min}$, and $\beta_{max}$. All of the points within the region 80 are permissible (supportable by the system 10) $\lambda$ and $\beta$ pairs. The driver and/or hardware logic unit preferably chooses (70) $\lambda$ and $\beta$ from a point in the lower left corner of the region 80. Specifically, $\lambda$ is chosen (70) as the integer value of $\lambda_{min}$ and $\beta$ is chosen (70) as:

$$\beta = ceil\left(\frac{\beta_{min}}{8}\right) \times 8,$$

where "ceil" indicates the ceiling subroutine explained above. This equation forces $\beta$ to meet or exceed $\beta_{min}$ and be a multiple of eight so that the display streamer 30 can request an integer number of QW. In other embodiments, the "eights" in the above equation may equal any number, including one. Note that the region 80 shrinks for higher resolutions and refresh rates. The region 80 may not contain any permissible points indicating an unsupportable display mode. The driver and/or hardware logic unit programs (72) the chosen $\lambda$ and $\beta$ values into the display streamer 30 and the process 50 ends (74).

Other embodiments are within the scope of the following claims.

What is claimed is:

1. A method of determining buffer management information for a data processing system, comprising:

determining a maximum amount of time that access to a local memory to obtain data to supply a display FIFO buffer memory may be delayed;

determining a drain rate at which data is to be drained from the display FIFO buffer memory based on a display mode supported by a graphics processor;

calculating a watermark value based on at least the maximum amount of time and the drain rate, wherein calculating the watermark value comprises multiplying the maximum amount of time and the drain rate; and making the watermark value available for management of the display FIFO buffer memory.

2. The method of claim 1, wherein the watermark value further comprises subtracting the product of the maximum amount of time and the drain rate from the size of the display FIFO buffer memory.

3. A method of determining buffer management information for a data processing system, comprising:

determining a maximum amount of time that access to a local memory to obtain data to supply a display FIFO buffer memory may be delayed;

determining a drain rate at which data is to be drained from the display FIFO buffer memory based on a display mode supported by a graphics processor;

calculating a burst length value based on at least the maximum amount of time and the drain rate; and making the burst length value available for management of the display FIFO buffer memory.

4. The method of claim 3, wherein:

$\lambda_{min}$ comprises the product of the maximum amount of time and the drain rate;

$\Phi$ comprises the size of the display FIFO buffer memory;

$\delta$ comprises the drain rate; and calculating the burst length value comprises performing the following operation:

$$\lambda_{min} x\left(\frac{\varphi}{\varphi - \delta}\right).$$

5. The method of claim 3, wherein calculating the burst length value comprises subtracting the result of the performed operation from the size of the display FIFO buffer memory.

* * * * *